(12) United States Patent
Ryne et al.

(10) Patent No.: US 11,648,977 B2
(45) Date of Patent: May 16, 2023

(54) STEER BY WIRE END OF TRAVEL STOP BRACKET

(71) Applicant: Steering Solutions IP Holding Corporation, Saginaw, MI (US)

(72) Inventors: Patrik M. Ryne, Lake Orion, MI (US); Floyd E. Eschenbacher, Freeland, MI (US); Laura F. Stock, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 547 days.

(21) Appl. No.: 16/826,151

(22) Filed: Mar. 20, 2020

(65) Prior Publication Data

US 2021/0291892 A1    Sep. 23, 2021

(51) Int. Cl.
*B62D 5/00*      (2006.01)
*B62D 1/185*     (2006.01)

(52) U.S. Cl.
CPC ............. *B62D 5/001* (2013.01); *B62D 1/185* (2013.01)

(58) Field of Classification Search
CPC ...... B62D 5/001; B62D 1/185; F16H 25/2015
See application file for complete search history.

(56) References Cited

U.S. PATENT DOCUMENTS

2020/0039561 A1* 2/2020 Appleyard ............. B62D 5/001

* cited by examiner

*Primary Examiner* — Jeremy R Severson
(74) *Attorney, Agent, or Firm* — Dickinson Wright PLLC

(57) ABSTRACT

A steering column assembly includes a jacket extending longitudinally about a jacket axis, the jacket defining an opening extending radially completely through the jacket. The steering column assembly also includes an end stop assembly disposed in the opening and protruding radially inwardly. The steering column assembly further includes a steering shaft, at least a portion of the steering shaft disposed within the jacket and extending longitudinally about the jacket axis. The steering column assembly yet further includes a stop ring mounted to the steering shaft, the stop ring positioned to contact the end stop assembly at an end of rotational travel position of the steering shaft.

18 Claims, 4 Drawing Sheets

STEER BY WIRE END OF TRAVEL STOP BRACKET

FIELD OF THE INVENTION

The present disclosure relates to steering columns and, more particularly, to a steering shaft travel stop bracket for steer-by-wire steering columns.

BACKGROUND

Steer-by-wire steering columns do not require an intermediate shaft. However, omission of this feature requires a rotational stop in the steering column to protect the certain components, such as the airbag coil, for example. Features referred to as "end of travel rings" are located on the steering shaft and driven by splines between the steering shaft and the end of travel rings. Such a ring system also requires a positive stop in the upper jacket of the steering column for the ring(s) to react against.

SUMMARY

According to one aspect of the disclosure, a steering column assembly includes a jacket extending longitudinally about a jacket axis, the jacket defining an opening extending radially completely through the jacket. The steering column assembly also includes an end stop assembly disposed in the opening and protruding radially inwardly. The steering column assembly further includes a steering shaft, at least a portion of the steering shaft disposed within the jacket and extending longitudinally about the jacket axis. The steering column assembly yet further includes a stop ring mounted to the steering shaft, the stop ring positioned to contact the end stop assembly at an end of rotational travel position of the steering shaft.

According to another aspect of the disclosure, a steering column assembly includes a jacket extending longitudinally about a jacket axis, the jacket defining an opening extending radially completely through the jacket. The steering column assembly also includes a bracket disposed in the opening and protruding radially inwardly, wherein the bracket is formed of a bracket material and the jacket is formed of a jacket material, wherein the bracket material is harder than the jacket material on a durometer scale. The steering column assembly further includes a steering shaft, at least a portion of the steering shaft disposed within the jacket and extending longitudinally about the jacket axis, wherein a stop portion of the jacket is positioned to contact the end stop assembly at an end of rotational travel position of the steering shaft.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, a portion of a jacket assembly of a steering column assembly is illustrated. The portion of the jacket assembly is generally referenced with numeral 10 in the Figures. While a single jacket component may form the jacket assembly 10, in some embodiments a plurality of jackets are operatively coupled to each other to form the overall jacket assembly. For example, a lower jacket and an upper jacket may be operatively coupled to each other. The jackets may include features that allow the jackets to be telescopingly moveable relative to each other for position adjustment. In the embodiments described herein, the portion of the jacket assembly 10 shown and referenced is an upper jacket.

Figure 2:
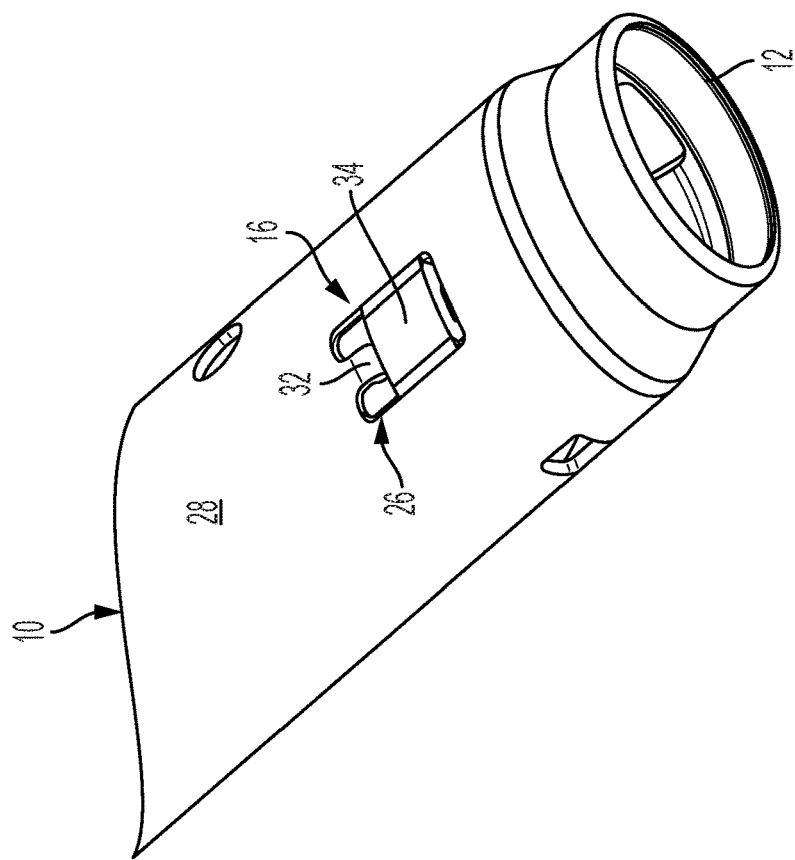
FIG. 2 is a perspective view of the jacket of a steering column assembly with the end stop assembly in an assembled condition.
Figure 1:
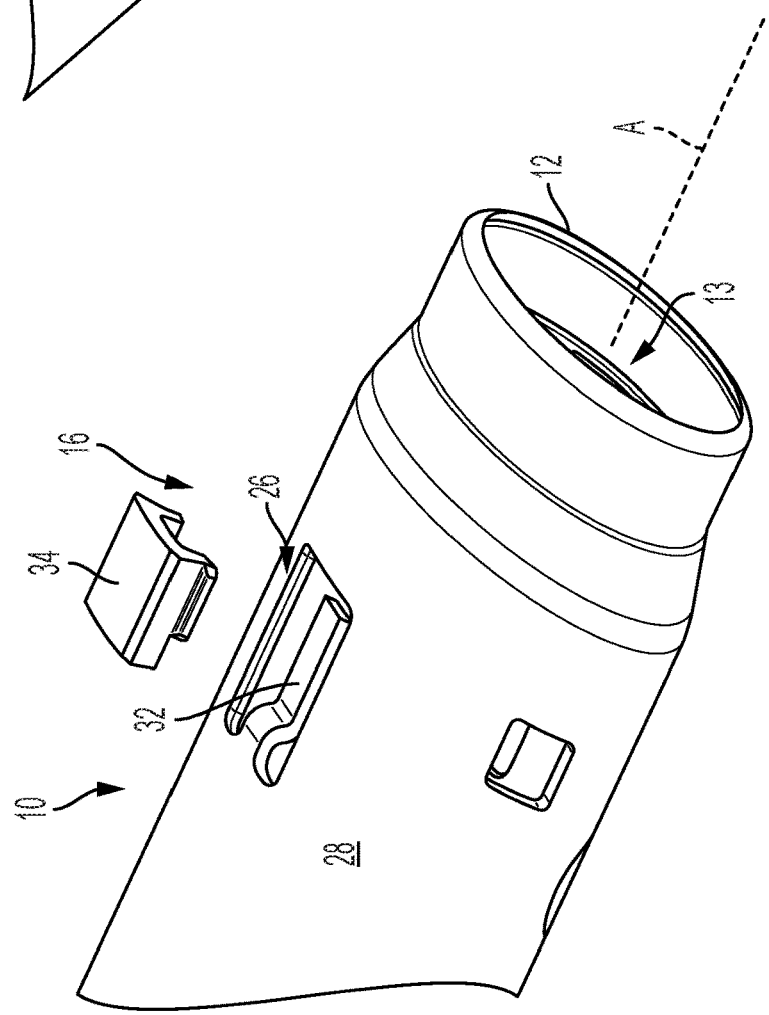
FIG. 1 is a perspective view of a jacket of a steering column assembly with an end stop assembly in a partially disassembled condition.
Figure 3:
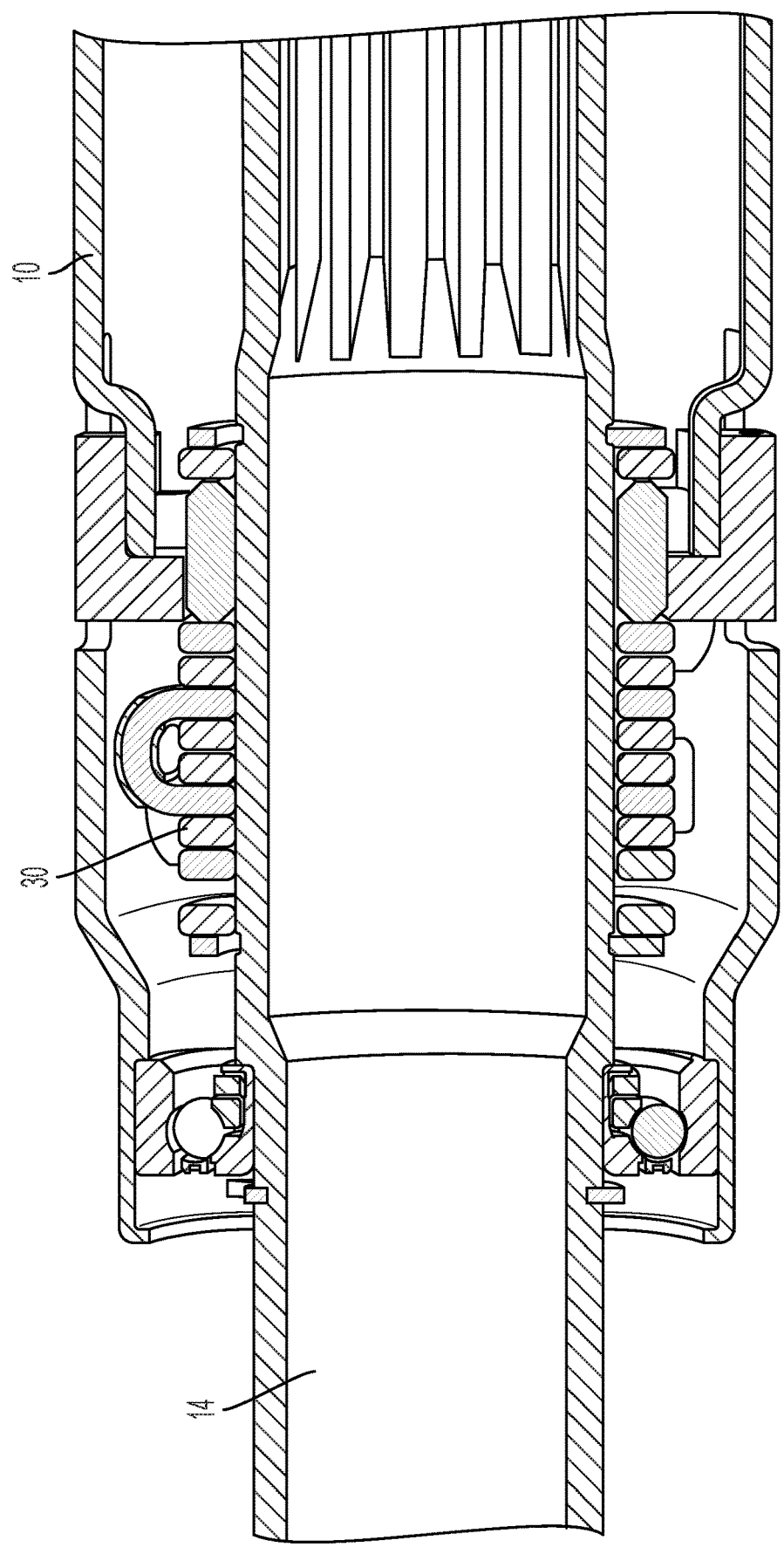
FIG. 3 is a cross-sectional view of the steering column assembly.

Referring to FIGS. 1 and 2, the jacket portion (e.g., upper jacket) is illustrated. The jacket assembly 10 includes an end 12 that is configured to receive a steering shaft 14 (FIG. 3) within a shaft opening 13 that extends along and about a jacket axis A. The steering shaft 14 extends about the jacket axis A and is free to rotate within the shaft opening 13 during operation. As will be appreciated from the disclosure herein, the jacket assembly 10 includes an end stop assembly 16 that limits rotation of the steering shaft 14.

Figure 4:
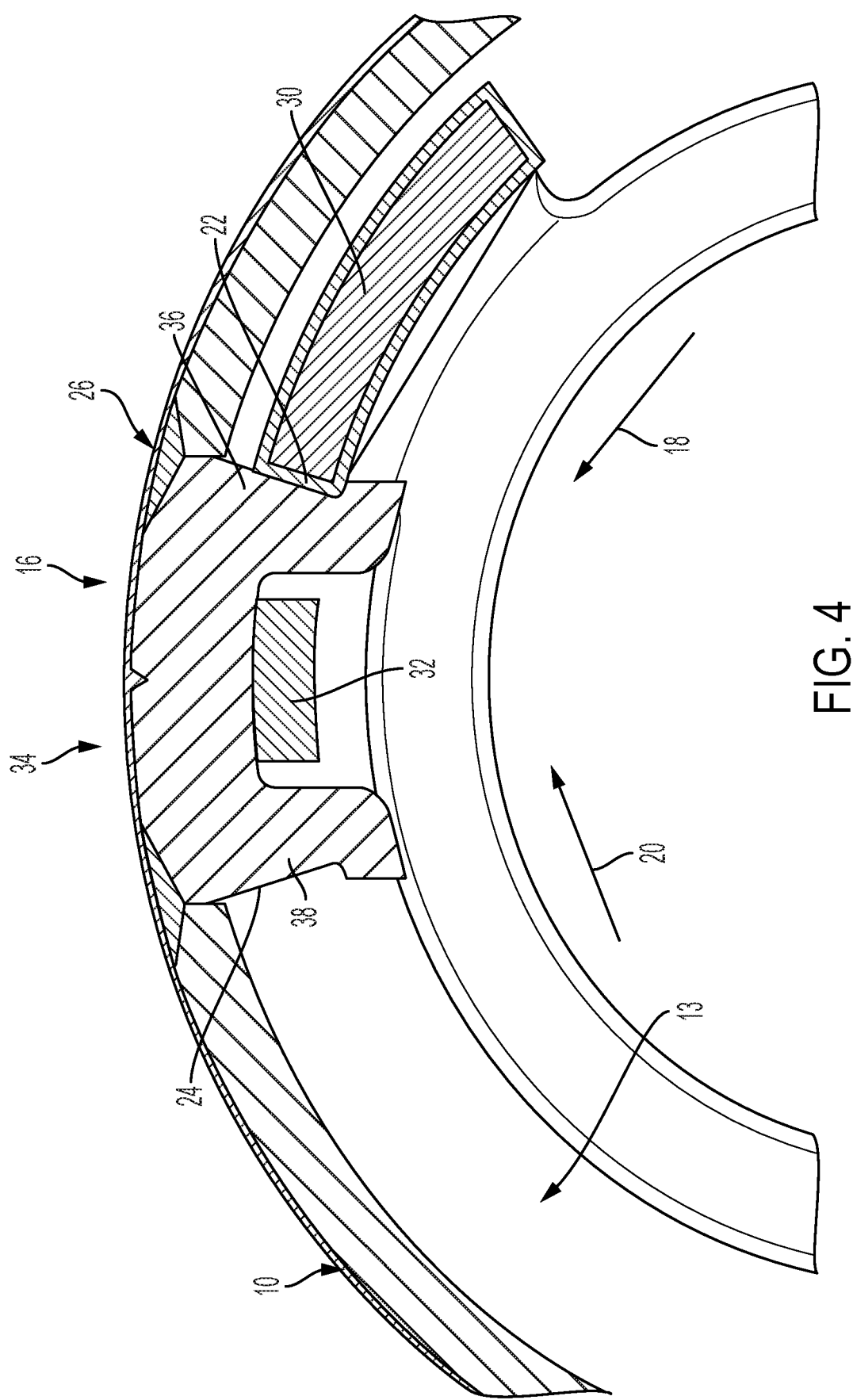
FIG. 4 is a cross-sectional view of the end stop assembly.

FIG. 4 is a cross-sectional view that illustrates the end stop assembly 16 and the jacket assembly 10—with the steering shaft 14 installed—in greater detail. As noted above, the steering shaft 14 is free to rotate within the shaft opening 13. In particular, the steering shaft 14 is rotatable in a first rotational direction 18 and a second rotational direction 20. The steering system that the jacket assembly 10 is part of includes rotational position limits in each rotational direction 18, 20. Each of these rotational position limits is defined by a portion of the end stop assembly 16 and may be referred to herein as end of rotational travel positions. In other words, the end stop assembly 16 defines a first end of rotational travel position 22 that limits rotation in the first rotational direction 18 and a second end of rotational travel position 24 that limits rotation in the second rotational direction 20.

Referring now to FIGS. 1-4, the end stop assembly 16 is disposed at least partially within an opening 26 defined by the jacket assembly 10. The opening 26 extends radially completely through a wall 28 of the jacket assembly 10. The end stop assembly 16 is positioned within the opening 16 in a manner that does not interfere with other components in close proximity thereto, such as an airbag coil, for example. The end stop assembly 16 protrudes radially inwardly to an extent that at least a portion of the end stop assembly 16 is located within the shaft opening 13. The portion of the end stop assembly 16 that protrudes radially inwardly and into the shaft opening 13 is positioned to define the first end of rotational travel position 22 and the second end of rotational travel position 24 by blocking rotation of an end stop ring 30 that is operatively coupled to, or integrally formed with, the steering shaft 14. It is to be appreciated that the end stop ring 30 may be a single ring or refer collectively to a plurality of rings in some embodiments. As shown, the end stop ring 30 extends radially outwardly from the remainder of the steering shaft 14 to an extent that it contacts the end stop assembly 16 at the end of rotational travel positions 22, 24.

In the illustrated embodiment of FIGS. 1-4, the end stop assembly 16 includes a finger tab 32 integrally formed with the jacket assembly 10 and a bracket 34 operatively coupled to the finger tab 32. The finger tab 32 may be operatively coupled to, or integrally formed with, the remainder of the jacket assembly 10 and extends into the opening 26. The finger tab 32 extends axially toward the end 12 of the jacket assembly 10, as well as radially inwardly into the opening 26. However, it is to be appreciated that the finger tab 32 may be in alternative orientations in other embodiments. For example, the finger tab 32 may extend axially from an opposite side of the opening 26, i.e. away from the end 12 of the jacket assembly 10. Regardless of the precise orientation of the finger tab 32, the finger tab 32 provides a structure for the bracket 34 to be mounted to. The bracket 34 may simply rest on the finger tab 32 or may be operatively coupled thereto in a clipped or snap-fit manner, or fastened thereto. The bracket 34 is secured to the jacket assembly 10 by any suitable method. In some embodiments, the bracket 34 is welded to the jacket assembly 10 at the wall that defines the opening 26 and/or on a radially outer surface of the jacket assembly 10.

A portion of the bracket 34 extends radially inwardly into the opening 26, as well as into the shaft opening 13, such that the bracket 34 is positioned to define the end of rotational travel positions 22, 24 of the steering shaft 14. In the illustrated embodiment, the bracket 34 includes a first leg 36, a second leg 38 and a hood portion 40. The hood portion 40 joins the first leg 36 and the second leg 38. As shown, the bracket 34 is formed in a substantially "horseshoe-shaped" or "U-shaped" geometry by the hood portion 40, the first leg 36 and the second leg 38. The hood portion 40 is positioned on a radially outer surface of the finger tab 32. The first leg 36 defines the first end of rotational travel position 22 of the steering shaft 14 during rotation in the first rotational direction 18, the second leg 38 defining the second end of rotational travel position 24 of the steering shaft 14 during rotation in the second rotational direction 20.

The bracket 34 is formed of a material that is harder than the material of the jacket assembly 10. For example, the bracket 34 may be formed of steel. This ensures that the interface between the end stop ring 30 and the material that defines the end of rotational travel positions is strong and not deformable. Therefore, the end stop assembly 16 can withstand higher turning torque requirements for the end of rotational travel position contact.

Figure 5:
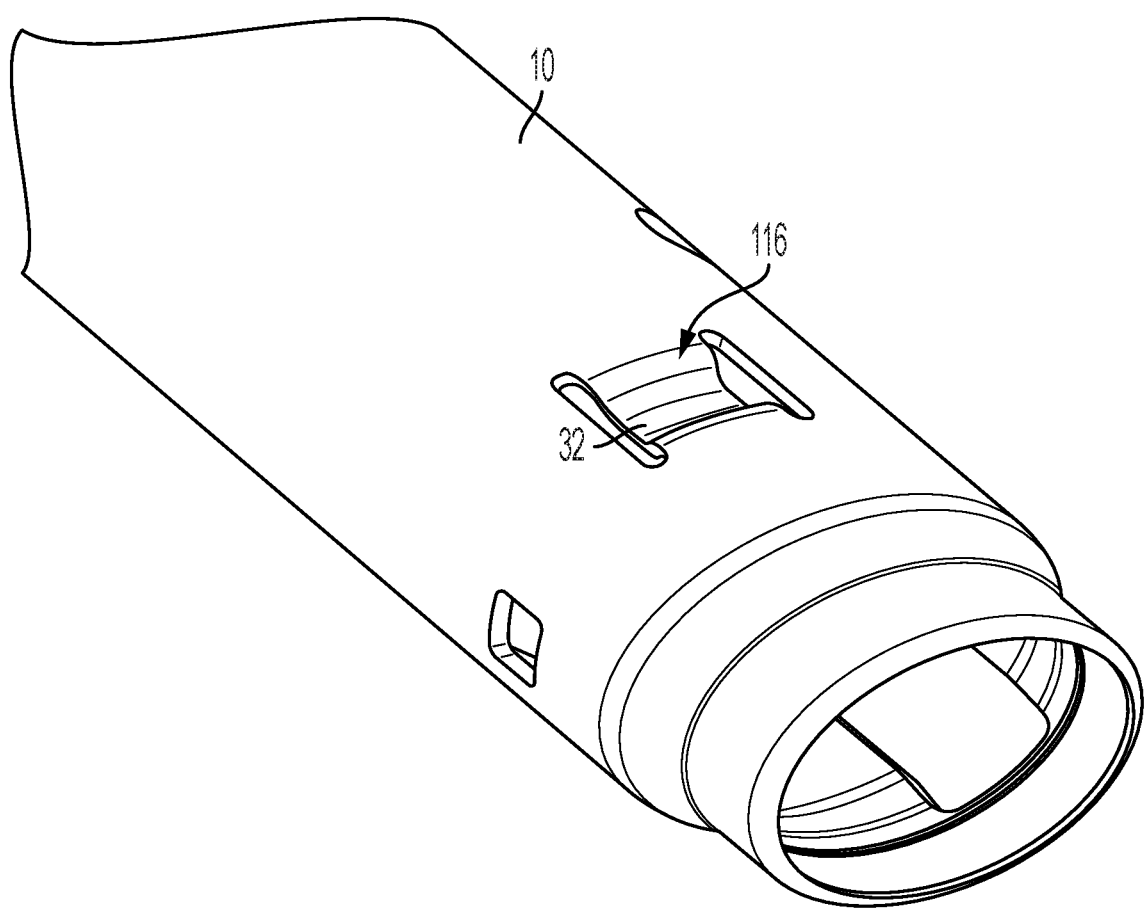
FIG. 5 is a perspective view of the end stop assembly according to another aspect of the disclosure.

Referring now to FIG. 5, another embodiment of the end stop assembly is illustrated and referred to with numeral 116. The end stop assembly 116 does not include the bracket 34 of FIGS. 1-4. Rather, the end stop assembly 116 includes the finger tab 32 as the structural member that is contacted by the end stop ring 30 to define the end of rotational travel positions 22, 24. The finger tab 32 in the embodiment of FIG. 4 may be reinforced with a surface coating or bumper that is provides a material that prevents deformation when contacted with a turning torque that is desirable for various applications.

The embodiments disclosed herein may be used with various types of steering systems and, more generally, vehicles. Steer-by-wire systems that do not include an intermediate shaft and autonomous vehicle would particularly benefit from the embodiments disclosed herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
   a jacket extending longitudinally about a jacket axis, the jacket defining an opening extending radially completely through the jacket;
   an end stop assembly disposed in the opening and protruding radially inwardly;
   a steering shaft, at least a portion of the steering shaft disposed within the jacket and extending longitudinally about the jacket axis; and
   a stop ring mounted to the steering shaft, the stop ring positioned to contact the end stop assembly at an end of rotational travel position of the steering shaft,
   wherein the end stop assembly comprises:
      a finger tab integrally formed with the jacket; and
      a bracket operatively coupled to the finger tab, a portion of the bracket having a portion extending radially inwardly into the opening and positioned to define the end of rotational travel position of the steering shaft,
   wherein the bracket is formed of a bracket material and the jacket is formed of a jacket material, wherein the bracket material is harder than the jacket material on a durometer scale.

2. The steering column assembly of claim 1, wherein the bracket includes a first leg, a second leg and a hood portion, the hood portion joining the first leg and the second leg.

3. The steering column assembly of claim 2, wherein the first leg defines a first end of rotational travel position of the steering shaft during rotation in a first direction, the second leg defining a second end of rotational travel position of the steering shaft during rotation in a second direction.

4. The steering column assembly of claim 1, wherein the bracket material is steel.

5. The steering column assembly of claim 1, wherein the steering column assembly is disposed in a steer-by-wire steering system.

6. The steering column assembly of claim 1, wherein the steering column assembly is disposed in an autonomous vehicle.

7. The steering column assembly of claim 1, wherein the jacket is an upper jacket of a jacket assembly.

8. A steering column assembly comprising:
   a jacket extending longitudinally about a jacket axis, the jacket defining an opening extending radially completely through the jacket;
   an end stop assembly disposed in the opening and protruding radially inwardly;
   a steering shaft, at least a portion of the steering shaft disposed within the jacket and extending longitudinally about the jacket axis; and a stop ring mounted to the steering shaft, the stop ring positioned to contact the end stop assembly at an end of rotational travel position of the steering shaft, wherein the end stop assembly comprises:
 a finger tab integrally formed with the jacket; and
 a bracket operatively coupled to the finger tab, a portion of the bracket having a portion extending radially inwardly into the opening and positioned to define the end of rotational travel position of the steering shaft, wherein the bracket is welded to the jacket.

9. A steering column assembly comprising:

a jacket extending longitudinally about a jacket axis, the jacket defining an opening extending radially completely through the jacket;

an end stop assembly disposed in the opening and protruding radially inwardly;

a steering shaft, at least a portion of the steering shaft disposed within the jacket and extending longitudinally about the jacket axis; and a stop ring mounted to the steering shaft, the stop ring positioned to contact the end stop assembly at an end of rotational travel position of the steering shaft, wherein the end stop assembly comprises a finger tab integrally formed with the jacket and protruding radially inwardly into the opening and positioned to define the end of rotational travel position of the steering shaft.

10. A steering column assembly comprising:

a jacket extending longitudinally about a jacket axis, the jacket defining an opening extending radially completely through the jacket;

a bracket disposed in the opening and protruding radially inwardly, wherein the bracket is formed of a bracket material and the jacket is formed of a jacket material, wherein the bracket material is harder than the jacket material on a durometer scale; and a steering shaft, at least a portion of the steering shaft disposed within the jacket and extending longitudinally about the jacket axis, wherein a stop portion of the jacket is positioned to contact the end stop assembly at an end of rotational travel position of the steering shaft.

11. The steering column assembly of claim 10, wherein the stop portion of the steering shaft is at least one stop ring protruding radially outwardly from the steering shaft.

12. The steering column assembly of claim 10, further comprising a finger tab integrally formed with the jacket and positioned adjacent to, or within, the opening of the jacket.

13. The steering column assembly of claim 12, wherein the bracket includes a first leg, a second leg and a hood portion, the hood portion joining the first leg and the second leg.

14. The steering column assembly of claim 13, wherein the hood portion rests on the finger tab and the bracket is welded to the jacket.

15. The steering column assembly of claim 13, wherein the first leg defines a first end of rotational travel position of the steering shaft during rotation in a first direction, the second leg defining a second end of rotational travel position of the steering shaft during rotation in a second direction.

16. The steering column assembly of claim 10, wherein the bracket material is steel.

17. The steering column assembly of claim 10, wherein the steering column assembly is disposed in a steer-by-wire steering system.

18. The steering column assembly of claim 10, wherein the steering column assembly is disposed in an autonomous vehicle.

\* \* \* \* \*